UNITED STATES PATENT OFFICE.

GEORGE GRAY AND ROBERT GRAY, OF NEW YORK, N. Y.

IMPROVEMENT IN WATER-PROOFING TEXTILE AND OTHER MATERIALS.

Specification forming part of Letters Patent No. 149,216, dated March 31, 1874; application filed March 13, 1874.

*To all whom it may concern:*

Be it known that we, GEORGE GRAY and ROBERT GRAY, both of the city, county, and State of New York, have invented a new and Improved Compound for Water-Proofing Textil> and other Materials; and we do hereby declare the following to be a full, clear, and exact description thereof, which will enable those skilled in the art to make and use the same.

This invention relates to a compound, the principal ingredients of which are india-rubber and collodion, which are mixed together with oil, sulphate of zinc, zinc-white, and, if desired, suitable pigments may be added to impart to the compound the required shades.

In carrying out our invention, we take india-rubber, one ounce; collodion, two ounces; zinc-white, four ounces; oil, eight ounces; sulphate of zinc, one ounce; and in order to mix these ingredients together, we proceed as follows: We boil the oil for about two hours together with the sulphate of zinc, then we strain the mixture to remove the sediment, and add the india-rubber, keeping the oil heated until the india-rubber is completely dissolved. While the solution is still warm we dilute it with sulphuric ether, using from eight to twelve ounces of ether to the solution of rubber, prepared in the proportion above stated. After the solution of rubber and the sulphuric ether have been intimately mixed, we add the collodion, and finally stir in the zinc-white. If desired, French chalk may be added, and the compound may be colored to any desired shade by aniline colors or other suitable pigments.

By following the above-described process, a homogenous mixture of collodion with a solution of india-rubber in oil can be produced, the success of the operation depending chiefly upon the addition of sulphuric ether to the solution of india-rubber in oil before the collodion is added. The oil which we use, by preference, is castor-oil, but any other heavy oil may be used.

This solution is intended principally for water-proofing textile fabrics; but it can also be used for other materials, such as paper, leather, &c.

What we claim as new, and desire to secure by Letters Patent, is—

1. A compound for water-proofing textile fabrics and other materials, made of collodion and a solution of india-rubber in oil, substantially in the manner set forth.

2. A compound for water-proofing textile fabrics and other materials, made of india-rubber, collodion, zinc-white, oil, and sulphate of zinc, and sulphuric ether, substantially in the manner described.

GEORGE GRAY.
ROBERT GRAY.

Witnesses:
W. HAUFF,
E. F. KASTENHUBER.